UNITED STATES PATENT OFFICE.

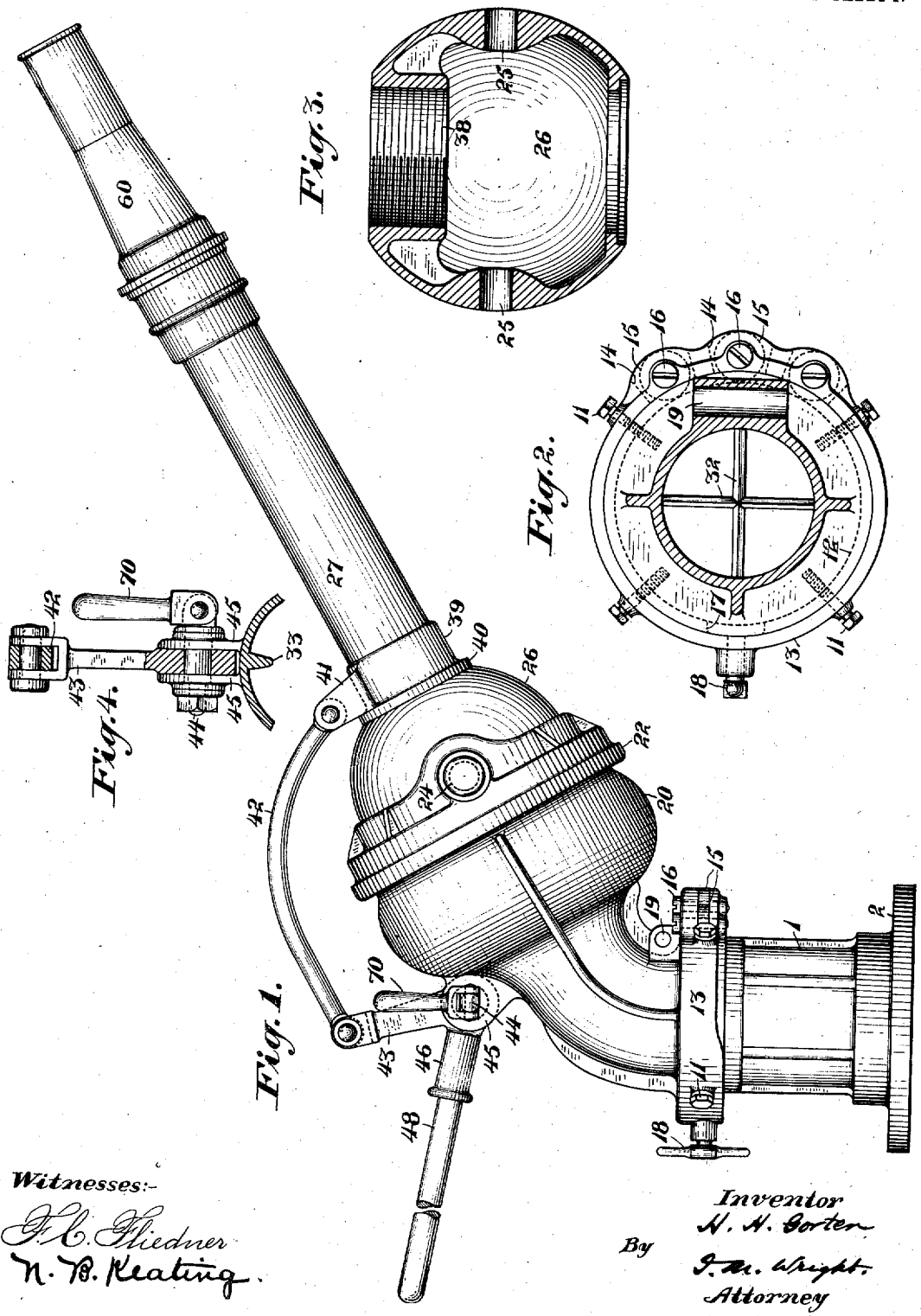

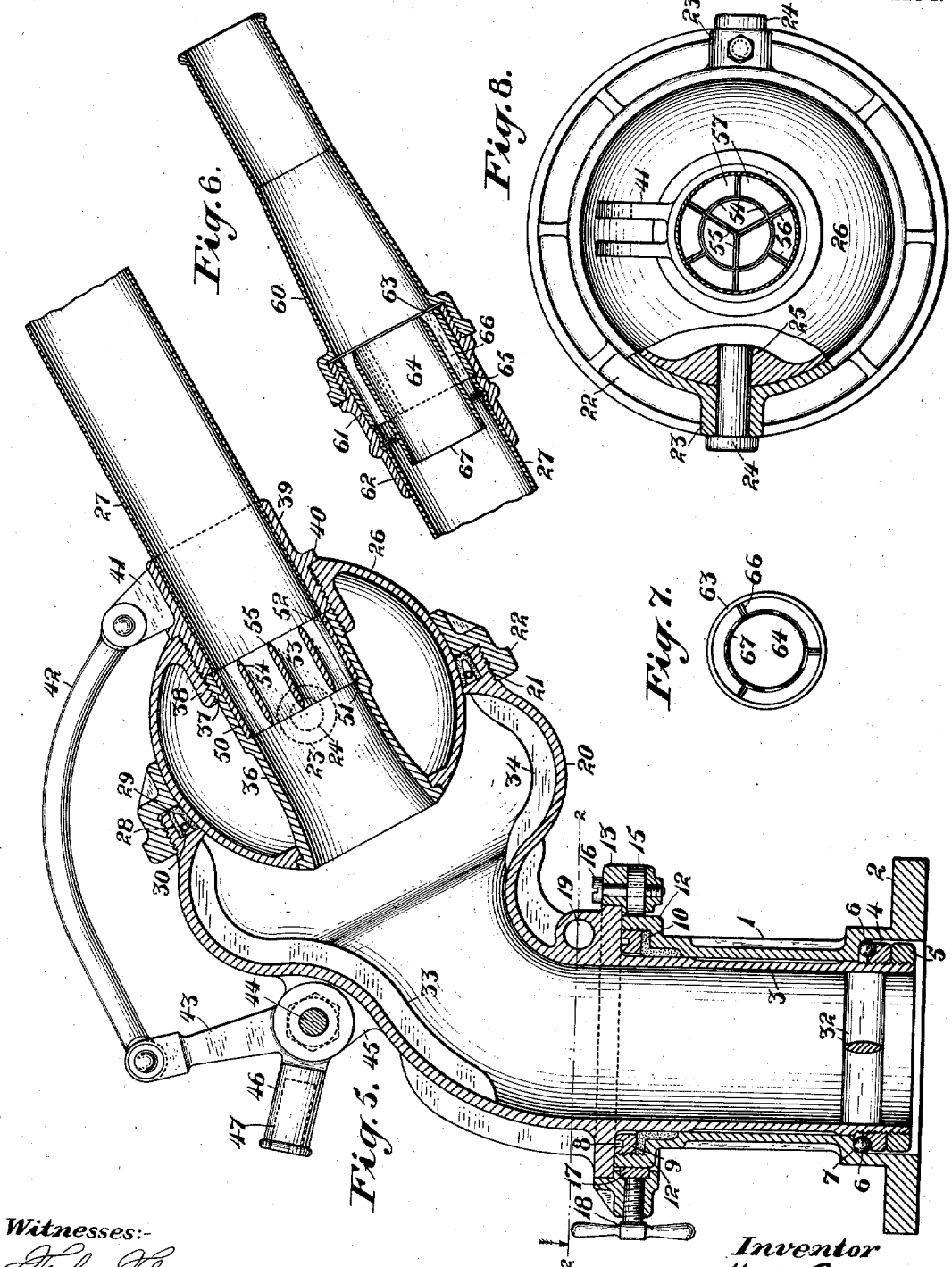

HENRY H. GORTER, OF SAN FRANCISCO, CALIFORNIA.

HIGH-PRESSURE NOZZLE.

984,557.  Specification of Letters Patent.  Patented Feb. 21, 1911.

Application filed September 22, 1909. Serial No. 519,035.

*To all whom it may concern:*

Be it known that I, HENRY H. GORTER, a citizen of the United States, residing at San Francisco, in the county of San Francisco and State of California, have invented new and useful Improvements in High-Pressure Nozzles, of which the following is a specification.

The present invention relates to an improved high pressure water nozzle, for use in fire boats, water towers, and fire extinguishing apparatus of all kinds, also for hydraulic mining, or wherever a high pressure nozzle is used.

The objects of the invention are; first, to provide a nozzle by which all the particles of the jet of water are directed outward with substantially the same velocity, and without any lateral or rotary motion, the effect being to produce a stream which will not spread, but will be maintained of a uniform diameter, like a solid bar, for a much greater length than has been obtained by nozzles heretofore provided; second, to provide a nozzle so constructed internally as to prevent eddies or churning in the water, and to avoid friction of the water, as much as possible especially at the point of juncture between the stationary and the movable parts of the nozzle; third, to provide a nozzle so constructed as to avoid forces produced by the impact of the water against the interior surfaces of the movable part of the nozzle tending to turn the same; fourth, to provide a nozzle, the movable part of which is at all times easily moved upon its support; fifth, to provide a nozzle, which can be very quickly locked in any desired position; sixth, wherein the means for producing uniformity in the velocity and direction of flow can be readily removed and replaced when desired; seventh, to provide one in which the ball bearing joint of the nozzle can be readily detached from the socket in which it moves.

In the accompanying drawings, Figure 1 is a broken side elevation of the apparatus; Fig. 2 is a section on the line 2—2 of Fig. 5; Fig. 3 is a detail sectional view of the outer ball section removed; Fig. 4 is an enlarged sectional view through the lever for vertically operating the nozzle; Fig. 5 is an enlarged vertical section through the lower portion of the apparatus; Fig. 6 is a similar view through the upper or terminal portion of the nozzle; Fig. 7 is an end view of the centralizer; Fig. 8 is a section above the ball joint, certain parts being broken away.

Referring to the drawing, 1 indicates a tubular lower portion of a nozzle which is adapted to be secured, either by being screwed, or by means of a flange, as shown at 2, to the end of a pipe or to an opening from a receptacle for water under pressure. Within said tube is inserted a sleeve 3, upon the lower end of which are screwed rings 4, 5, the upper ring 4 being formed with a runway for balls 6 which also travel within an annular rounded corner 7 formed in the lower portion of the tube 1. These balls receive the upward thrust of the nozzle against the tube 1 while avoiding friction from said thrust. Screwed into an enlarged upper end of said tube by a suitable device applied to sockets 8 therein, is a ring 9, between which and said tube is an angular packing ring 10, the inner surface of which bears against the outer surface of the sleeve 3, and prevents escape of water therefrom. Secured by screws 11 to a flange 12 formed on said tube 3 is a ring 13 formed with a plurality, three being here shown, of recesses 14, in which are contained rollers 15 on vertical screws 16 screwed into said ring and forming journal pins for said rollers. Said rollers bear against the upper enlarged portion of the tube 1, and take the back thrust of the stream of the nozzle, while avoiding friction, thus enabling the sleeve 3 to be turned easily within the tube 1. It can be clamped in any desired position therein by means of a shoe 17 which is screwed against the enlarged portion of the tube 1 by a screw 18. Above said flanged portion of the tube 1 there is formed transversely in the wall of the sleeve 3 an aperture 19, into which can be inserted a bar constituting a turning lever for the purpose of turning the nozzle horizontally by hand, this being effected with comparative ease owing to the aforesaid arrangement of the balls 6. Said sleeve has at the top a cup-shaped enlargement 20 extending from the lower portion of the sleeve in a general direction of about 30 degrees, and has a circular end threaded on the outside, as shown at 21, upon which is screwed a fulcrum ring 22, in which are formed the fulcrums or bearings 23 for fulcrum pins 24 which enter sockets 25 formed in the wall of the ball or spherical shaped lower portion 26 of the nozzle proper 27. Said circular end is formed with a recess 28 to receive a packing 29 formed of a strip of leather folded longitudinally, one side thereof engaging the outer surface of the ball 26, and the other engaging the inner surface of said recess 28. Between the two sides of said strip is interposed a coiled spring 30, being of bronze the coil being bent into a circle and inserted between the two sides of said strip, tending to keep said sides as far apart as possible. Said packing 29 is below, or on the near side of, the axis upon which said ball turns, so that, by unscrewing the bearing ring 22, the ball section of the nozzle can be readily removed from the socket section thereof. It is desirable from this class of devices to eliminate as much as possible any churning action in the water during its course from its source of supply to the end of the nozzle since such churning or eddying causes loss of power by friction. To avoid this action, there are cast within the lower end of the sleeve 3 bars 32 crossing each other at right angles, each bar being comparatively thin in proportion to its height and having sharp upper and lower edges, so as to prevent any lateral or eddying motion of the liquid passing through. To attain the same object there are also formed in the inner surface of the enlarged or flaring upper portion 20 of the sleeve two opposite inwardly extending longitudinal ribs 33, 34. These ribs also reduce the lateral motion of the water and prevent eddies or churning.

Within the ball portion of the nozzle an inner wall 36, substantially cylindrical in form is screwed, as shown at 37, into a cylindrical flange 38, formed integral with the outer spherical wall 26. Also screwed into said flange 38 and abutting against the end of said inner wall 36, is the lower end of a nozzle tube 39, having a flange 40 which abuts against the spherical wall 26 of the ball portion of the nozzle. Extending from said nozzle tube 39 are a pair of lugs 41, to which is pivoted an end of a link 42, the other end of which is connected to the forked end of an arm of a bell crank lever 43, pivoted on a bolt 44 passed through two lugs 45 cast upon the wall of the cup-shaped socket section 20 of the nozzle, another arm 46 of said bell crank lever being formed with a socket 47 to receive the end of a lever bar 48, by which said bell crank lever can be turned to turn the ball section of the nozzle in its socket on its journal pins.

The inner cylindrical wall of the ball portion is formed in its inner surface with a cylindrical recess 50 having a shoulder 51 in which recess is received the cylindrical wall 52 of an equalizer 53, formed with an inner cylindrical wall 54 and radial walls 55, 56, which divide the interior of said equalizer into compartments 57, nine being here shown, all of these compartments being prismatic in form and of substantially the same area.

When a stream of water is flowing through a conduit at a high velocity, the velocity of the stream in the center will be greater than that at the circumference in contact with the walls of the conduit. Now if a stream of water issues from a nozzle in which the outer portions are projected at a less velocity than the central portion, the effect is, that the central portion, issuing with a greater velocity than the outer portion, imparts to said outer portions a lateral motion causing the stream of water to spread. It is therefore very desirable to obtain in such a stream a velocity in all of the particles as uniform as possible. This result is effected by the above described equalizer, since it sets up a slight retardation of the stream of water, dividing the stream into sections, each of which may be considered as a separate jet, flowing through a chamber of the equalizer, their velocities being rendered uniform by reason of the fact that the equalizer permits the water to escape equally through each section thereof.

Upon the upper portion of the nozzle tube is screwed a tapering tip 60, and within a recess 61 in the end casing 62 of the nozzle tube is secured the cylindrical outer wall 63 of a centralizer 64, said wall abutting against a shoulder 65 formed on the nozzle tip and having also therewithin, and supported by radial ribs or walls 66, a slightly conical centralizing wall 67, which is slightly larger in diameter than the end of the nozzle tip. As the liquid flows from the equalizer to the outer end of the nozzle tube the outer portions are retarded, by the friction against the wall of said nozzle tube, while the central portion retains its high velocity. It is desirable to permit only this central portion, having a high velocity, to emerge from the nozzle tip. It is to effect this purpose that the centralizer is provided. This centralizer permits the central part of the stream of water to flow through the central wall with practically undiminished velocity, the outer portion of said stream forming a liquid wall for the central portion, and being held back within the nozzle tip by the pressure of said central portion of the stream, so that the outer portion of the stream practically never escapes, and the only portion which emerges is the central part which has passed through the central wall of the centralizer.

An important feature of this invention resides in the form of the ball and socket. In prior forms of nozzles having ball and socket joints, as, for instance, that shown in my United States Patent No. 557,799, the nozzle tube, carrying the nozzle tip, was connected to the socket, and the ball was connected to the stationary section. The result was that the stream of water passing through the inner wall of the ball section of the nozzle impinged with great force against the inner surface of the socket carrying the nozzle, tending to turn it upon the ball, and this tendency had to be resisted by powerful means, as, for instance, a screw working in a nut attached to the socket. Owing to the great pressure of the stream of water impinging against said socket it required great force to turn the same when in operation. In my present form of ball and socket joint, whatever be the position of the ball joint, the pressure thereon is balanced, so that there is no difficulty in turning the same within the socket. This allows of a quick action, because the force required to move it does not have to be increased by mechanical means, said increase of force involving a sacrifice of speed.

The ball section can be locked in any desired position by means of a lever 70 having a forked end pivoted upon the end of the bolt 44, the end of said lever being formed eccentrically to the bolt, so that upon turning the lever in line with the bolt, the bell crank lever 43 is fixedly clamped between the two lugs 45, these lugs being made of considerable size so as to provide a large frictional surface to grip the bell crank lever.

It will be observed that the edge of extension 20, where it contacts with the spherical portion of the nozzle, is normal to said spherical portion, and said extension curves gradually inward from said edge to the sleeve.

It is important that the parts 64 and 51 be readily removable, because they are apt to be quickly worn by sand gravel and the like forced through the nozzle by the high pressure of the water, and, in fact, large pieces of stone might become lodged in said parts and obstruct the flow of the water.

I claim:—

1. In a high pressure nozzle, the combination of a tubular outer portion formed in its inner surface with a lower run-way for balls, a nozzle, a sleeve within said outer portion, carrying the nozzle, a ring secured upon the lower end of said sleeve, a ring of balls between said ring and run-way, said sleeve having at its upper end a flange, and rollers carried by said flange, bearing against the side of said tubular portion adjacent to the nozzle, the axis of said rollers being parallel with the axis of the sleeve, substantially as described.

2. In a high pressure nozzle, the combination of a rotatable sleeve having a cup-shaped extension directed at an angle with the general direction of said sleeve, and enlarged at the outer end, a nozzle, and a ball-shaped joint portion for said nozzle, the part thereof remote from said nozzle rotating within said cup-shaped extension, said extension and ball joint being provided with means for preventing the escape of water therebetween, the outer end of said extension being threaded, a ring screwed on said threaded end of the extension, said ring and ball-shaped portion having journal bearings adapted to register with each other to receive journal pins therein, substantially as described.

3. In a high pressure nozzle, the combination of a rotatable sleeve having a cup-shaped extension directed at an angle with the general direction of said sleeve, and enlarged at the outer end, a nozzle, and a ball-shaped joint portion for said nozzle, the part thereof remote from said nozzle rotating within said cup-shaped extension, said extension and ball joint being provided with means for preventing the escape of water therebetween, the outer end of said extension being threaded, a ring screwed on said threaded end of the extension, said ring and ball-shaped portion having journal bearings outside the end of said extension, adapted to register with each other to receive journal pins therein, substantially as described.

4. In a high pressure nozzle, the combination of a rotatable sleeve having an enlarged extension, a nozzle, a ball-shaped joint portion for said nozzle, a ring screwed on said extension, bearings carried by said ring within which said spherical shaped portion is pivoted, the end of said extension abutting against said spherical portion being substantially normal thereto, and curving inward to the upper end of said sleeve, substantially as described.

5. In a high pressure nozzle, in combination with a sleeve having a cup-shaped extension, a nozzle, and a joint portion for said nozzle, comprising a spherical outer portion having an inwardly extending internally threaded tubular portion, and a cylindrical tube screwed at one end into said internally threaded portion, substantially as described.

In testimony whereof I have hereunto set my hand in the presence of two subscribing witnesses.

HENRY H. GORTER.

Witnesses:
 FRANCIS M. WRIGHT,
 D. B. RICHARDS.